United States Patent
Oh

(10) Patent No.: US 7,850,558 B2
(45) Date of Patent: Dec. 14, 2010

(54) POWER TRANSMISSION APPARATUS FOR COMPRESSOR

(75) Inventor: Seong Taek Oh, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 74 days.

(21) Appl. No.: 11/860,219

(22) Filed: Sep. 24, 2007

(65) Prior Publication Data

US 2008/0076612 A1    Mar. 27, 2008

(30) Foreign Application Priority Data

Sep. 25, 2006   (KR) .................... 10-2006-0092622

(51) Int. Cl.
*F16H 55/48* (2006.01)
(52) U.S. Cl. ................... 474/94; 474/70; 474/161; 474/166; 474/190; 474/199; 464/10; 464/32; 464/88
(58) Field of Classification Search ............ 474/94, 474/190, 32–33, 69, 70; 464/32, 88
See application file for complete search history.

(56) References Cited

U.S. PATENT DOCUMENTS

| 6,332,842 | B1 | 12/2001 | Tabuchi et al. | |
|---|---|---|---|---|
| 6,494,799 | B1* | 12/2002 | Ochiai | 474/94 |
| 7,066,819 | B2 | 6/2006 | Ueda et al. | |
| 2002/0092146 | A1* | 7/2002 | Tsutsui et al. | 29/419.1 |
| 2004/0009818 | A1* | 1/2004 | Son | 464/32 |
| 2004/0063503 | A1* | 4/2004 | Aoki et al. | 464/32 |
| 2004/0176200 | A1* | 9/2004 | Nosaka et al. | 474/166 |
| 2005/0209009 | A1* | 9/2005 | Son | 464/32 |
| 2005/0239555 | A1* | 10/2005 | Ueda et al. | 464/32 |
| 2006/0194663 | A1 | 8/2006 | Kouno | |
| 2006/0270498 | A1* | 11/2006 | Kanou et al. | 474/70 |

FOREIGN PATENT DOCUMENTS

| JP | 10-299855 A | 11/1998 |
|---|---|---|
| JP | 2002-372130 A | 12/2002 |

* cited by examiner

*Primary Examiner*—Robert A Siconolfi
*Assistant Examiner*—San Aung
(74) *Attorney, Agent, or Firm*—Birch, Stewart, Kolasch & Birch, LLP

(57) ABSTRACT

A power transmission apparatus for a compressor used in an air conditioner for a vehicle including a damper mounted to one side of a pulley rotated by a driving power transmitted from an engine wherein the damper and an elastic portion is formed between an outer ring and an inner ring, and wherein a mounting flange of the outer ring is coupled to the pulley and a mounting flange of the inner ring is coupled to a limiter. The limiter has a plate shape and comprises: a middle portion in a ring shape, an outside portion in a ring shape around the edge of the middle portion, and a neck portion connecting the middle portion and the outside portion, whereby upon overload, the neck portion is broken. The middle portion of the limiter is coupled to a hub, and the hub penetrates the center of the inner ring and is coupled to the limiter between the damper and the pulley.

6 Claims, 3 Drawing Sheets

[Fig.1] Prior Art
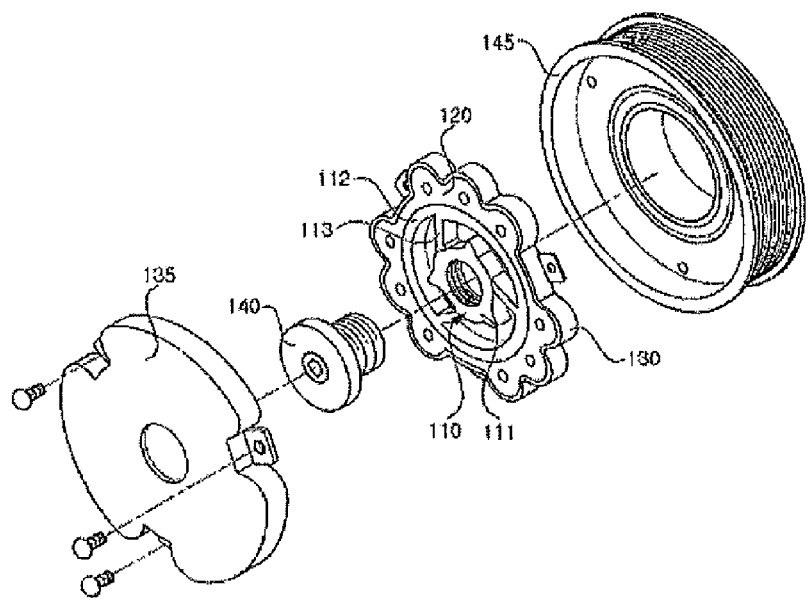
[Fig.2]
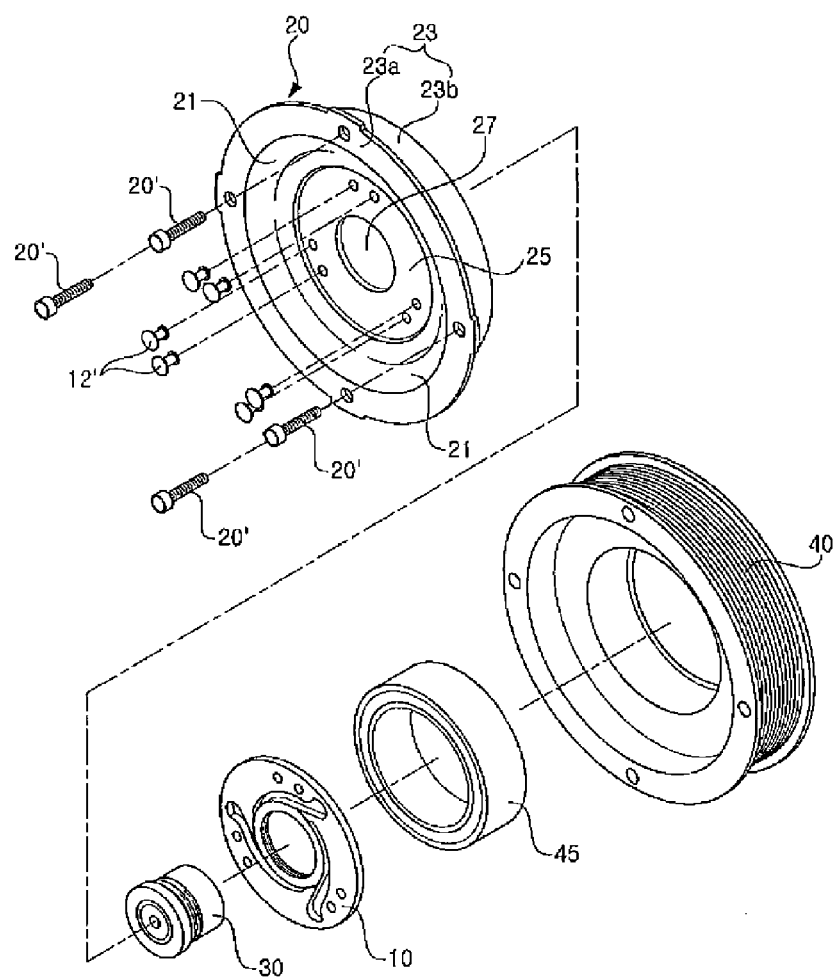

[Fig.3]
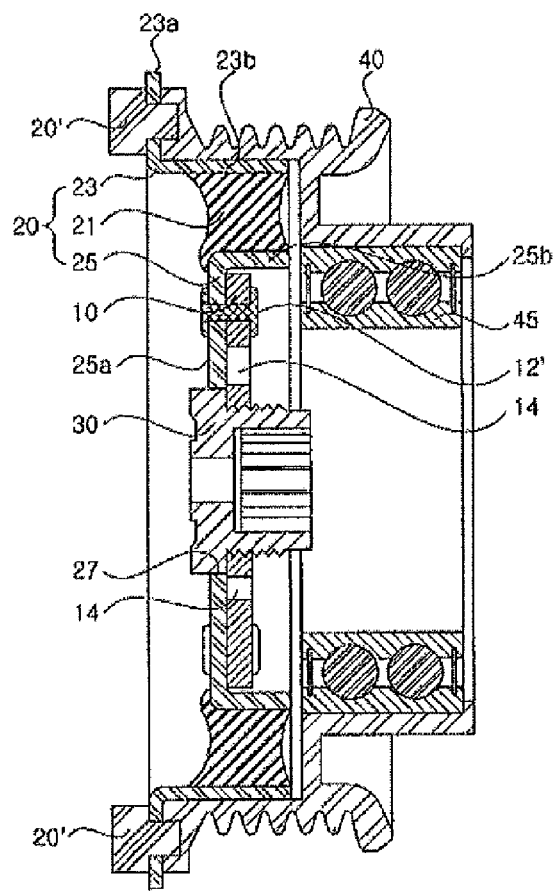
[Fig.4]
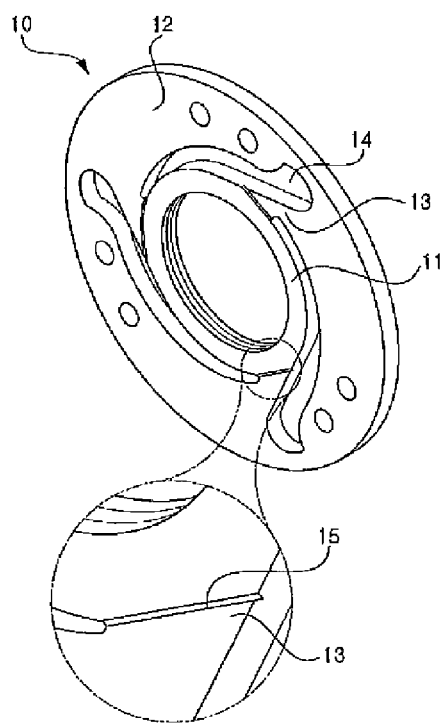

[Fig.5]
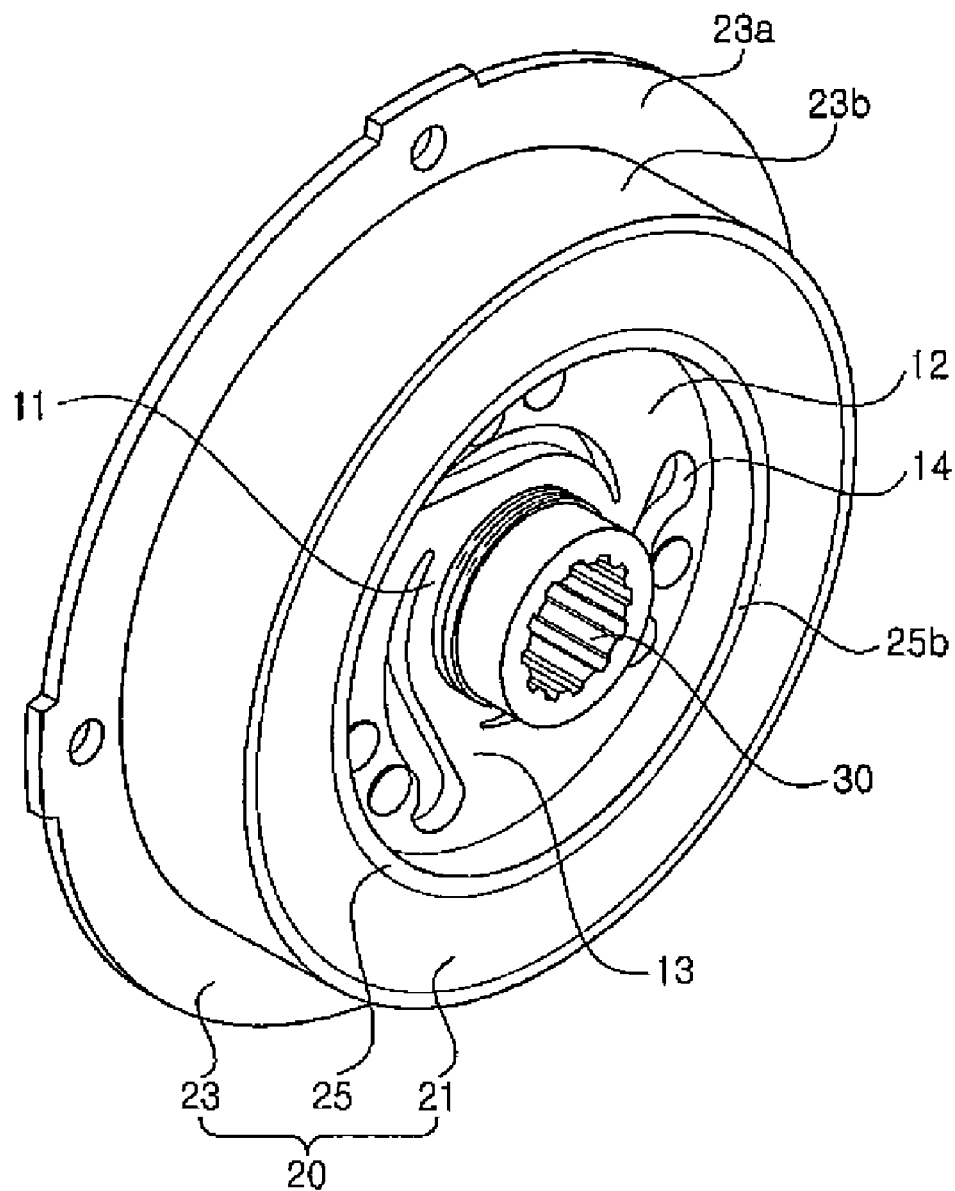

POWER TRANSMISSION APPARATUS FOR COMPRESSOR

CROSS-REFERENCE TO RELATED APPLICATION

This application claims the benefit of Korean Patent Application No. 2006-92622, filed on Sep. 25, 2006, the disclosure of which is hereby incorporated herein by reference in its entirety.

BACKGROUND OF THE INVENTION

1. Technical Field

The present invention relates to a power transmission apparatus for a compressor used for an air conditioning system for a vehicle, and more particularly, to a power transmission apparatus for a compressor, which cuts off power transmission from an engine to the compressor when overload occurs in the compressor.

2. Discussion of Prior Art

With reference to FIG. 1, a conventional power transmission apparatus for a compressor will be described. A pulley 145 is rotated by a driving power transmitted from an engine, and a hub 140 is connected to a driving shaft of the compressor. A limiter 110 is installed between the pulley 145 and the hub 140, so as to transmit power. When a torque being or above a predetermined value occurs in the compressor, the limiter 110 cuts off the power transmission between the pulley 145 and the hub 140. A damper 120 is integrally formed around an outer circumference of the limiter 110, to absorb an impact. Semicircle-shaped protrusions are formed on an outer circumferential surface of the damper 120 at predetermined intervals.

A fixed cover 130 is connected to an outer edge surface of the damper 120. The fixed cover 130 prevents separation of the damper 120 and is fixed to the hub 140. A dust cover 135 facing one side of the hub 140 is connected to the pulley 145, together with the fixed cover 130. The dust cover 135 prevents broken pieces of the limiter 110 from scattering to the outside.

In the aforementioned conventional power transmission apparatus for a compressor, a driving power transmitted from the engine is transmitted to the compressor to be driven. The driving power transmitted from the engine to the pulley 145 is transmitted to the fixed cover 130 connected to the pulley 145 and is transmitted to the limiter 110 through the damper 120 inside the fixed cover 130. Then, since the limiter 110 is connected to the hub 140, the hub 140 is rotated by rotation of the pulley 145 and the driving shaft of the compressor connected to the hub 140 is rotated so that the compressor is operated. Therefore, the air conditioning of a vehicle is performed, using circulation of refrigerant which is compressed and discharged according to the driving of the compressor.

When the compressor stops rotating due to a defect thereof, the hub 140 connected to the driving shaft of the compressor stops rotating. However, since the pulley 145 connected to the engine is rotated by the driving power provided by the engine, the driving power acts on the fixed cover 130 connected to the pulley 145 and the damper 120 positioned inside the fixed cover 130. Accordingly, since an outer ring 112 part of the limiter 110 formed integrally with the damper 120 attempts rotation while an inner ring 111 part of the limiter 110 connected to the hub 140 resists rotation, a torsion torque is generated in a bridge 113 connecting the inner ring 111 and the outer ring 112. When the torsion torque increases and the bridge 113 is not able to endure the torsion torque, the bridge 113 breaks. Accordingly, the pulley 145 is capable of rotating even though the hub 140 is not rotated. A belt connecting the engine and the pulley 145 is not damaged.

When the power is transmitted or cut off, the damper 120 attached to the outer circumferential surface of the limiter 110 repeats constriction and stretch to absorb an impact upon the power transmission or cut-off.

When the limiter 110 is broken by the torsion torque, broken pieces of the bridge 113 connecting the inner ring 111 and the outer ring 112 may scatter. However, since the dust cover 135 covering the limiter 110 and the damper 120 is connected to the one side of the pulley 145, the broken pieces of the bridge 113 are prevented from scattering to the outside. That is, the dust cover 135 prevents the broken pieces of the bridge 113 from affecting the engine and others and prevents error operation of the limiter 110 by protecting the limiter part from external foreign materials.

Further, since the dust cover 135 is installed, water is prevented from directly flowing into the connection part between the limiter 110 and the hub 140 or into the pulley 145, thereby delaying corrosion of main parts of the power transmission apparatus and improving durability of the parts, such as bearings.

However, in the conventional power transmission apparatus for a compressor, since the limiter 110 and the damper 120 are formed integrally with each other, it is not easy to manufacture the limiter 110 and the damper 120. Moreover, since the damper 120 and the fixed cover 130 are formed in a complicate shape, it is not easy to perform a press process of the fixed cover 130.

Specifically, since the limiter 110 and the damper 120 are manufactured integrally, the materials thereof cannot be different. Accordingly, in manufacturing the integrally formed limiter 110 and damper 120, materials to satisfy the performance of limiter 110 or damper 120 has to be used. In the conventional art, the damper 120 is manufactured using the materials having fragility to satisfy the performance of the limiter 110. As a result, since both of the limiter 110 and the damper 120 are made of the materials having fragility, there is a problem in that the damper 120 is easily broken.

The aforementioned problem is found in U.S. Pat. No. 7,066,819 which is a conventional art in this technological field. That is, in a hub connecting a shaft and a pulley, an inner cylinder connected to the shaft is formed inside a disk, an outer circumferential member connected to the pulley is positioned outside the disk, and a damper is integrally positioned between an edge of the disk and the pulley. The inner cylinder includes a relatively thin part which is broken upon over load. Therefore, since the disk, the damper and the part being broken upon over load are integrally formed in the hub, U.S. Pat. No. 7,066,819 has the aforementioned problems.

SUMMARY OF THE INVENTION

Therefore, the present invention is directed to provide a power transmission apparatus for driving a compressor, which has constitutional parts to be more easily manufactured.

Another object of the present invention is to provide a power transmission apparatus for driving a compressor, which is more simply manufactured.

According to an aspect of the present invention for achieving the objects, there is provided a power transmission apparatus for a compressor, which comprises: a pulley rotated by a driving power transmitted from an engine: a hub connected to a driving shaft of the compressor, for transmitting the driving power transmitted through the pulley to the driving shaft; a limiter in a plate shape installed between the pulley and the hub, for transmitting power and cutting off the power transmission between the pulley and the hub when load over a predetermined value occurs in the compressor; and a damper connected to the limiter and the pulley, for absorbing an impact due to a torque change, wherein the damper comprises an outer ring coupled to the pulley, an inner ring having an outside portion coupled to the limiter and a center-hole in the center for receiving the hub to be rotatable, and an elastic portion positioned between the outer ring and the inner ring, for absorbing the impact according to the torque change.

Preferably, the limiter may be in a plate shape and comprise: a middle portion forming a female screw portion to be screwed on an outer circumferential surface of the hub, an outside portion coupled to the damper by a rivet, and a neck portion which is breakable between the middle portion and an edge by a plurality of through-portions formed on the outside portion.

Preferably, the neck portion may include a notch connected to one side of the through-portion.

Preferably, the damper may include a mounting flange of the outer ring to be connected to one side of the pulley, the limiter may be connected to the inner ring of the damper between the damper and the one side of the pulley, and the hub may be connected to the limiter by penetrating the center-hole included in the inner ring of the damper.

The inner ring and the outer ring of the damper may be formed of a material of relatively higher toughness than the limiter, and the limiter may be formed of a material of higher fragility than the outer ring and the inner ring.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is an exploded perspective view of a conventional power transmission apparatus for a compressor;

FIG. 2 is an exploded perspective view of a power transmission apparatus for a compressor according to an embodiment of the present invention;

FIG. 3 is a sectional view of the power transmission apparatus according to the embodiment of the present invention;

FIG. 4 is a perspective view of a limiter of the power transmission apparatus according to the embodiment of the present invention; and FIG. 5 is a back perspective view of a damper and a limiter which are main constituents of the power transmission apparatus according to the embodiment of the present invention.

DETAILED DESCRIPTION OF THE INVENTION

The present invention will now be described more fully hereinafter with reference to the accompanying drawings, in which preferred embodiment of the invention is shown.

As illustrated in the drawings, a pulley 40 is rotated by a driving power transmitted from an engine through a belt, and a hub 30 is connected to a driving shaft of a compressor and is rotated by a driving power of the pulley 40. The pulley 40 is installed around a rotation shaft (not shown) so as to be rotated by a bearing 45.

A limiter 10 and a damper 20 are installed to be connected to each other between the pulley 40 and the hub 30. The limiter 10 is connected to the hub 30 and the damper 20 is connected to the pulley 40. When load is over a predetermined value in the compressor, the limiter 10 cuts off the power transmission between the pulley 40 and the hub 30. The limiter 10 is formed in a plate shape, preferably, in a disk shape. The damper 20 is mounted on the pulley 40 and absorbs an impact due to a torque change by using elasticity.

The aforementioned constitutional elements will be described in more detail. As illustrated in FIG. 4, the limiter 10 comprises a middle portion 11 in a ring shape, an outside portion 12 in a ring shape provided around an edge of the middle portion 11, and a neck portion 13 connecting the middle portion 11 and the outside portion 12. A female screw is formed in an inner surface of the middle portion 11, so as to be screw-coupled to an outer circumferential surface of the hub 30. The outside portion 12 of the limiter 10 is coupled to the damper 20 by a rivet 12'.

The neck portion 13 is configured by forming a plurality of through-portions 14 on the outside portion 12 of the limiter 10. The through-portions 14 are formed to be extended in a tangent line direction of a virtual circle around a central shaft about which the limiter 10 rotates. A part of each through-portion 14, which is connected to the neck portion 13, becomes progressively narrower towards an end thereof in width. As illustrated in FIG. 4, the neck portion 13 includes a notch 15 which is extended from the end of the through-portion 14 and which is capable of generating stress concentration.

For reference, the shape of the through-portion 14 is not limited to the embodiment as illustrated. In the embodiment, one end of the through-portion 14 has a curved surface and the other end thereof becomes progressively narrower in width. However, both ends of the through-portion 14 may have a curved surface. Further, as illustrated in the conventional art, both ends thereof may have a flat surface or an inclined surface.

The constitution of the damper 20 will be described. As described in FIG. 5, the damper 20 comprises an outer ring 23 which is coupled to an outer surface of one side of the pulley 40 by a bolt 20' and which is extended to the inside of the pulley 40. The outer ring 23 comprises a mounting flange 23a for the coupling with the pulley 40, and a cylindrical body 23b formed integrally with the mounting flange 23a. The mounting flange 23a is formed to extend towards the center of the outer ring 23 by a predetermined width, along the circumference of one end of the cylindrical body 23b. The mounting flange 23a is mounted to the pulley 40 by the bolt 20'. The cylindrical body 23b forms a space for forming an elastic portion 21 which will be described below. When the damper 20 is mounted to the pulley 40, the cylindrical body 23b is positioned inside the pulley 40.

The damper 20 further comprises an inner ring 25 corresponding to the outer ring 23. The inner ring 25 is coupled to the outside portion 12 of the limiter 10 by a rivet. The inner ring 25 also comprises a mounting flange 25a and a cylindrical body 25b. The mounting flange 25a is formed to extend towards the center of the inner ring 25 by a predetermined width. The center of the mounting flange 25a includes a center-hole 27 into which the hub 30 is inserted to be rotatable.

The cylindrical body 25b of the inner ring 25 is positioned inside the cylindrical body 23b of the outer ring 23. These cylindrical bodies 23b and 25b cooperatively form a ring-shaped space. The elastic portion 21 made of a rubber material is included in the space. That is, the elastic portion 21 for absorbing an impact due to a torque change is formed by injection-molding the rubber material in the space. The constitution of the elastic portion 21 does not need to be made of the rubber material and may be formed by using any other proper material having elasticity.

Preferably, the outer ring 23 and the inner ring 25 forming the damper 20 may be formed of iron containing metals/aluminum alloys which have high toughness, and the limiter 10 may be manufactured by a sintering process to relatively increase fragility.

The power transmission apparatus for a compressor according to the embodiment of the present invention transmits the driving power transmitted from the engine to the compressor, so that the compressor is driven.

The driving power transmitted from the engine to the pulley 40 is transmitted to the limiter 10 through the damper 20 connected to the pulley 40. Since the limiter 10 is connected to the damper 20 and to the hub 30 simultaneously, the driving power is transmitted to the hub 30. Accordingly, the driving shaft of the compressor connected to the hub 30 rotates to drive the compressor, so that refrigerant is compressed by the driving of the compressor, thereby performing air-conditioning of a vehicle.

When the rotation of the driving shaft of the compressor stops due to a defect of the compressor, the hub 30 connected to the driving shaft resists rotation while the damper 20 connected to the pulley 40 which is rotated by the engine attempts to continuously rotate. Consequently, the outside portion 12 of the limiter 10 connecting the damper 20 and the hub 30 attempts rotation but the middle portion 11 thereof resists rotation.

That is, although the middle portion 11 of the limiter 10 connected to the hub 30 cannot be rotated, the driving power is transmitted to the outside portion 12 of the limiter 10 connected to the inner ring 25 by the rivet, so that a torsion torque is generated in the neck portion 13 of the limiter 10. When the neck portion 13 is broken as the load concentrates, the middle portion 11 and the outside portion 12 of the limiter 10 separate from each other so that the middle portion 11 stops and the outside portion 12 rotates. Accordingly, the pulley 40 is capable of rotating, regardless of no rotation of the hub 30, and the belt connecting the engine and the pulley 40 is not damaged. For reference, since the notch 15 is formed in one end of the neck portion 13, when the load concentrates, the breakage occurs, along the notch 15.

Since the hub 30 is inserted in the center-hole 27 in the center of the inner ring 25 of the damper 20, broken pieces generated by the breakage of the limiter 10 are prevented from scattering to the outside of the damper 20 by the inner ring 25 and the hub 30. That is, the mounting flange 25a of the inner ring 25 and the damper 20 cover the limiter 10 not to be exposed outside. Accordingly, even though any additional dust cover is not used, all neighboring parts are prevented from being damaged by the broken pieces of the limiter 10.

Further, since the limiter 10 and the damper 20 are formed in a separate structure, the limiter 10 is easily manufactured. Since the damper 20 is coupled to the pulley 40 while the limiter 10 is mounted inside the damper 20, a total length of package for a power transmission part is reduced.

As illustrated above, in accordance with the power transmission apparatus for a compressor of the present invention, since the limiter and the damper are in the separate structures, it is easy to manufacture the limiter. When the limiter needs to be replaced according to the kinds of a machine, changes of a design structure, and rotational direction of a compressor, it is possible to replace the limiter only, without changing designs of any other components.

Furthermore, in accordance with the power transmission apparatus for a compressor of the present invention, manufacturing and assembling are easy and material consumption is reduced, compared to a conventional design structure, so that the cost is reduced.

Furthermore, in accordance with the power transmission apparatus for a compressor of the present invention, since the limiter is coupled to the damper connected to the pulley by using the rivet, variability of an inside torque of the compressor and variability of an engine torque are absorbed, so that a fatigue life of the limiter is extended.

Furthermore, since the limiter is positioned between one side of the pulley and the damper and the hub is connected to the limiter through the center of the damper, the hub and the damper prevents the broken pieces of the limiter, so that no additional dust cover is needed to prevent the broken pieces of the limiter from scattering and therefore the constitution of the components is simplified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power transmission apparatus for a compressor, comprising:

a pulley rotated by driving power transmitted from an engine;

a hub connected to a driving shaft of a compressor, for transmitting the driving power transmitted through the pulley to the driving shaft;

a limiter having a plate shaped configuration disposed between the pulley and the hub, for transmitting power and cutting off power transmission between the pulley and the hub when load exceeds a predetermined value in the compressor; and a damper connected to the limiter and the pulley, for absorbing impact due to a torque change, the damper comprising an outer ring having a first cylindrical body and coupled to the pulley, an inner ring having a mounting flange and a second cylindrical body, the mounting flange being coupled to the limiter and having a center-hole in the center for rotatably receiving the hub and the second cylindrical body being formed integrally with the mounting flange and being positioned inside the first cylindrical body, and an elastic portion disposed between the outer ring and the inner ring, for absorbing impact due to the torque change, wherein the limiter is adapted to cut off power transmission by breakage of a neck portion formed between the inner ring and the hub, wherein the limiter, in its plate shaped configuration, comprises:

a middle portion providing screw engagement with an outer circumferential surface of the hub, an outside portion coupled to the damper, and a breakable neck portion disposed between the middle portion and the outside portion by a plurality of through-portions formed on the outside portion, said neck portion being breakable between said middle portion and an edge portion by the plurality of said through portions formed on said outside portion and wherein the mounting flange is formed to extend towards the center of the inner ring by a predetermined width, such that the mounting flange covers the limiter so as not to be exposed to the outside.

2. The power transmission apparatus according to claim 1, wherein the neck portion comprises a notch formed to be connected to one side of the through-portion.

3. The power transmission apparatus according to claim 2, wherein the damper comprises a mounting flange of the outer ring to be connected to one side of the pulley, the limiter is connected to the inner ring of the damper between the damper and the one side of the pulley, and the hub is connected to the limiter by penetrating the center-hole included tin the inner ring of the damper.

4. The power transmission apparatus according to claim 1, wherein the inner ring and the outer ring of the damper are formed of a material of relatively higher toughness than the limiter, and the limiter is formed of a material of higher fragility than the outer ring and the inner ring.

5. The power transmission apparatus according to claim 2, wherein the notch is formed in one end of the neck portion whereby when the load exceeds said predetermined value breakage occurs along the notch.

6. A vehicle air conditioning system containing a power transmission apparatus for a compressor as defined in claim 1.

* * * * *